Figure 1:
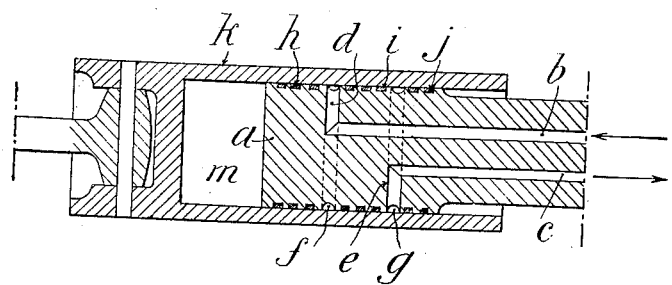

No. 832,956. PATENTED OCT. 9, 1906.
M. CASTELNAU.
APPARATUS FOR LUBRICATING.
APPLICATION FILED FEB. 2, 1905.

WITNESSES:
W. M. Avery
A. E. Fay

INVENTOR
Marcellin Castelnau
BY
ATTORNEYS ced: # UNITED STATES PATENT OFFICE.

MARCELLIN CASTELNAU, OF PARIS, FRANCE, ASSIGNOR TO SOCIÉTÉ DES MOTEURS À HAUTE TENSION, OF PARIS, FRANCE.

APPARATUS FOR LUBRICATING.

No. 832,956.  Specification of Letters Patent.  Patented Oct. 9, 1906.

Application filed February 2, 1905. Serial No. 243,861.

*To all whom it may concern:*

Be it known that I, MARCELLIN CASTELNAU, engineer, a citizen of the Republic of France, residing at Paris, 28 Rue de Washington, in the Republic of France, have invented certain new and useful Improvements in Apparatus for Lubricating, of which the following is a specification.

This invention is based on a new principle as to the lubrication of engines. This principle is characterized in the first place by a process for the plentiful and perfect lubrication of the members subjected to friction, the lubricant being applied and acting clear of any contact with the gases, steam, vapors and the like which are at work. It is characterized in the second place by the almost total recovery of the lubricant used.

Heretofore the lubrication of steam, oil, gas, spirit, and compressed-air engines and the like is produced by the introduction of the lubricant either directly into the steam or other motive-power fluid or into the cylinders. The lubricant which escapes with the steam or with the gases, the air, or the like is entirely lost.

This invention is applicable to steam, combustion, or other engines or motors operating at the highest temperatures in that notwithstanding the contact with metal surfaces subjected to a dark-red heat the lubrication of the piston is still insured without either decomposition or any serious amount of consumption of the lubricant. In this case the present system of lubrication is particularly advantageous in that it allows of avoiding the artificial cooling down of the cylinder, which now diminishes to a very great extent the efficiency of combustion-motors and prevents our making the most of the advantage offered by the high temperatures of the gases or vapors, as shown by theory. To obtain these results, I provide in the fixed frictional part two ducts, one for the incoming fresh lubricant under pressure and the other for the outgoing lubricant which has been used, and I put these ducts in communication with the frictional surfaces by means of orifices so arranged that they are never uncovered by the movable part and that the orifices for the incoming lubricant lie between the pressure-chamber of the motor and the orifices for the outgoing lubricant. Of course these ducts may be also fitted in the movable part. Between the said orifices there is thus formed a very narrow annular space, always closed both in front and behind by the segments of the piston, and in which the lubricant is so channeled that the greater part of the lubricant introduced at the incoming orifice passes through the outgoing orifice and can be gathered without its having been subjected to the contact of the steam of the gases or of the air in the motor, and consequently without the least alteration of the lubricating matter, however high may be the temperature of the frictional surfaces. There also results from this means the possibility of causing to circulate around the piston plentiful surplus of lubricant, as the latter is gathered without any deterioration and almost without any deperdition, and also the faculty of using any sort of lubricating matter whatever its price, such as oil, ordinary glycerin, saponified water, and the like.

This invention is applicable to any kind of engine or motor, whether the piston is fixed and the cylinder movable or the piston is movable and the cylinder fixed, whether single acting or double acting, and the like. Furthermore, it can be applied either to distributing-pistons or to driving-pistons.

Figure 2:
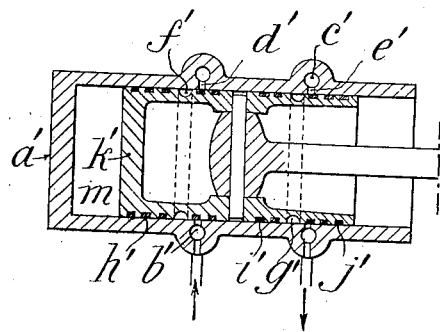

In the accompanying drawings, which show, by way of example, two forms in which this invention can be carried out, Figure 1 is a sectional view of a fixed piston in a movable cylinder. Fig. 2 is a sectional view of a fixed cylinder having a movable piston.

In the engine or motor shown in Fig. 1 in the fixed piston $a$ there are formed ducts $b$ and $c$, respectively, for the incoming lubricant under pressure and the outgoing lubricant. The said ducts are connected by one or several transversal passages $d$ or $e$ with circular grooves $f$ or $g$ made in the surface of the piston, between three series of segments $h\ i\ j$, which constitute a packing for the piston and which are applied against the wall of the movable cylinder $k$. The grooves $f$ and $g$ are so located that the groove $f$ for the incoming lubricant lies between the pressure-chamber $m$ and the outgoing groove $g$ and that the latter is never uncovered by the cylinder. In fact, the cylinder never even moves past a point near the left of the last segment $j$.

By the combined effect of the forcing pressure in the duct $b$, produced by any suitable lubricating-pump, and the pressure of the motive-power fluid in the chamber m the lubricant circulates from the groove f toward the groove g between the walls of the piston and those of the cylinder and escapes through the duct c, which conducts it in a cooled state to any suitable receptacle to be used again after being separated from the impurities carried forward by it. In its passage through the engine or motor the lubricant has been channeled out of all contact with the gases, the steam, or the air, so that notwithstanding the high temperature to which it has been subjected it has not been altered in any way.

In the arrangement shown in Fig. 2, $b'$ and $c'$ designate circular ducts provided in the fixed cylinder $a'$ and connected with the inner wall of the said cylinder by transversal passages $d'$ $e'$ in less or greater number. Circular grooves $f'$ and $g'$ are again made in the piston $k'$ between three series of segments $h'$ $i'$ $j'$.

The orifices of the incoming and outgoing passages $d'$ $e'$ for the lubricant are again arranged, as hereinbefore described, so as never to be uncovered by the movable member $k'$ and that the incoming orifices lie between the outgoing orifices from the pressure-chamber m. That being so, the operation is the same as in the previous case.

Similar arrangements, but double ones, may be used in double-acting engines or motors.

Modifications may be made in the minor arrangements of the lubricating ducts and orifices without departing from the present invention. In particular there may be made in the case of a fixed cylinder, in the wall of the latter, grooves extending obliquely from the orifices $d$ $e$ to get a longer communication between the said orifices and the grooves $f$ $g$, &c. These grooves may be also formed in the cylinder or both in the two frictional parts.

I claim—

A lubricating device comprising a cylinder having a pressure-chamber, and a piston, one of said parts being provided with spaced annular grooves in its contacting surface and having inlet and outlet ducts communicating with the grooves, the inlet-duct communicating with the groove nearest the pressure-chamber.

In testimony that I claim the foregoing as my invention I have signed my name in presence of two subscribing witnesses.

MARCELLIN CASTELNAU.

Witnesses:
JOHN BAKER,
MAURICE ROUX.